United States Patent
Tal et al.

(10) Patent No.: US 6,532,457 B1
(45) Date of Patent: Mar. 11, 2003

(54) LOOK-AHEAD TREE STRUCTURE

(75) Inventors: Alex Tal, Hadera (IL); Itzchak Gabbay, Haifa (IL)

(73) Assignee: Ezchip Technologies Ltd., Yokneam (IL)

( * ) Notice: Subject to any disclaimer, the term of this patent is extended or adjusted under 35 U.S.C. 154(b) by 298 days.

(21) Appl. No.: 09/616,877

(22) Filed: Jul. 14, 2000

(51) Int. Cl.$^7$ .............................................. G06F 17/30
(52) U.S. Cl. ............................. 707/1; 707/7; 707/102; 707/3
(58) Field of Search ........................... 707/1, 2, 7, 100, 707/102; 370/255; 709/1

(56) References Cited

U.S. PATENT DOCUMENTS

| | | | | |
|---|---|---|---|---|
| 5,546,390 A | * | 8/1996 | Stone | 707/7 |
| 5,829,004 A | * | 10/1998 | Au | 707/100 |
| 5,873,078 A | * | 2/1999 | Angle et al. | 707/102 |
| 5,924,091 A | * | 7/1999 | Burkhard | 707/1 |
| 6,223,174 B1 | * | 4/2001 | Ladwig et al. | 707/1 |
| 6,298,340 B1 | * | 10/2001 | Calvignac et al. | 370/255 |
| 6,396,842 B1 | * | 5/2002 | Rochberger | 370/255 |

OTHER PUBLICATIONS

Byte, "RISC–Base Mainboard Advancements" Aug. 1997.*

* cited by examiner

*Primary Examiner*—Diane D. Mizrahi
*Assistant Examiner*—Yicun Wu
(74) *Attorney, Agent, or Firm*—Mark M. Friedman

(57) ABSTRACT

A method and system for storing and retrieving data using a radix-search tree is disclosed. The method encorporates: (a) storing a plurality of nodes, each of the nodes having node-attributes, in a radix-search tree, and (b) retrieving the node-attributes of the plurality of nodes in single memory access. The system encorporates: (a) a data storage module for storing a plurality of sub-trees containing a plurality of nodes having node attributes, wherein the node attributes of at least one of the sub-trees are stored in a contiguous memory block, and (b) a processor that is operative to perform operations including: (i) transferring the node attributes of at least one of the sub-trees to the data storage module, and (ii) retrieving the node attributes of at least one of the sub-tree s from the data storage module.

26 Claims, 3 Drawing Sheets

LOOK-AHEAD TREE STRUCTURE

FIELD AND BACKGROUND OF THE INVENTION

The preset invention relates to radix-search methods, and, in particular, to a method and system for achieving improved performance of radix-search methods by using a look-ahead tree structure in conjunction with a high band-width memory access.

The Binary Search Tree (BST) is a well-known and commonly-used data structure which, when coupled with an appropriate algorithm, can provide fast average-case performance for numerous symbol-table operations, including search, insert, select, and sort. BSTs are often appropriate for systems having wild cards, varying-length entries, and systems in which a longest-prefix match approach is necessary. BSTs are often particularly appropriate for text entries or text-containing entries.

The running time of algorithms on BSTs is dependent on the shape of the tree. Sedgewick ("Algorithms in C++", Addison Wesley, 1998) in surveying the performance characteristics of BSTs, summarizes:

"Specifically, the path-length and height measures of binary trees . . . relate directly to the cost of searching in BSTs. The height is the worst-case cost of a search, the internal path length is directly related to the cost of search hits, and external path length is directly related to the cost of search misses."

BSTs are known, however to have bad worst-case performance, and various approaches have been developed over the years to improve the structure (balance) of BSTs, including randomized BSTs, skip lists, splay BSTs, and optimization.

In another approach, termed radix-search methods, the search proceeds by examining the search keys one small piece at a time, rather than using full comparisons between keys at each step. Radix-search methods are particularly suited to handling variable-length keys. They also provide reasonable worst-case performance without the need to balance trees using one of the above-mentioned techniques.

Two important disadvantages, noted by Sedgewick, are that such search methods can make inefficient use of space, and that performance can suffer if efficient access to he bytes of the keys is not available.

In recent years, the market has made increasingly-dramatic demands on performance, a trend that, according to all indications, will continue in the foreseeable future. This is particularly true of networking applications. One approach to meeting these performance demands is to increase the band-width in order to access or transfer more data, in parallel, per clock cycle. While current bus widths of 16 bits and 32 bits are typical for memory access, it is possible to design memory access systems having bus widths of 256 bits, 512 bits, and more, particularly when working with embedded memory.

Unfortunately, current search methods (and devices) are not designed towards accessing so much data in an individual clock cycle. Thus, the amount of useful data that can be accessed does not increase in proportion to the increase in bus width. Conventional tree search techniques examine one node per memory access. In many common applications, the node contains only 20–60 bits of useful information, a far cry from the 256 bits or 512 bits that can be transferred in a single memory access.

There is therefore a recognized need for, and it would be highly advantageous to have, a look-ahead tree structure and a search method therefor, that would allow efficient utilization of the memory access potential of high band-width architectures, such that the information transfer would be significantly improved over what has been known heretofore.

SUMMARY OF THE INVENTION

The present invention is a method and system for achieving improved performance of radix-search methods by using a look-ahead tree structure in conjunction with a high band-width memory access.

According to the teachings of the present invention there is provided a method for storing and retrieving data using a radix-search tree having nodes and leaves comprising: (a) storing a plurality of nodes, each of the nodes having node-attributes, in a radix-search tree, and (b) retrieving the node-attributes of the plurality of nodes in a single memory access.

According to further features in the described preferred embodiments, the radix-search tree is stored in a contiguous memory block.

According to still further features in the described preferred embodiments, the plurality of node-attributes includes node-attributes of two nodes in series.

According to still further features in the described preferred embodiments, the plurality of node-attributes includes node-attributes of at least three nodes in series.

According to still further features in the described preferred embodiments, the plurality of node-attributes includes node-attributes of an entire sub-tree.

According to further features in the described preferred embodiments, the plurality of no e-attributes is arranged in at least one table.

According to still further features in the described preferred embodiments, the plurality of node-attributes includes at least one pointer pointing to at least one address located within the contiguous memory block.

According to still further features in the described preferred embodiments, the plurality of node-attributes includes at least one pointer pointing to at least one address selected from the group consisting of node address and leaf address, the at least one address being located outside of the contiguous memory block.

According to yet another aspect of the present invention there is provided a system for storing and retrieving data using a radix-search tree having nodes and leaves, wherein at least one node has a right child and a left child, the system comprising: (a) a data storage module for storing a plurality of sub-trees containing a plurality of nodes having node attributes, wherein the node attributes of at least one of the sub-trees are stored in a contiguous memory block, and (b) a processor that is operative to perform operations including: (i) transferring the node attributes of at least one of the sub-trees to the data storage module, and (ii) retrieving the node attributes of at least one of the sub-trees from the data storage module.

According to further features in the described preferred embodiments, the processor is operative to retrieve the node attributes of each of at least one of the sub-trees is a single memory access.

According to still further features in the described preferred embodiments, the node-attributes include a first pointer pointing to a node address within the contiguous memory block, and a second pointer pointing to a node address located outside of the contiguous memory block.

According to still further features in the described preferred embodiments, the node-attributes are arranged in at least one table.

According to still further features in the described preferred embodiments, the node-attributes include at least one pointer pointing to at least one address selected from the group consisting of node address and leaf address, the at least one address being located outside of the contiguous memory block.

According to still further features in the described preferred embodiments, the at least one pointer pointing to at least one address selected from the group consisting of node addresses and leaf address is stored in a separate table.

According to still further features in the described preferred embodiments, the plurality of node-attributes includes a single pointer that is used to identify t e memory addresses of both the right child and the left child of the node.

According to still further features in the described preferred embodiments, the memory addresses are stored in adjacent rows of the at least one table. The memory addresses can also be stored in adjacent columns of the at least one table.

According to still further features in the described preferred embodiments, the node-attributes include the node-attributes of two nodes in series.

According to still further features in the described preferred embodiments, the node-attributes include node-attributes of at least three nodes in series.

According to still further features in the described preferred embodiments, the node-attributes include node-attributes of an entire sub-tree having at least three nodes in series.

According to still further features in the described preferred embodiments, at least 100 bits of useful information are retrieved in a single memory access. More preferably, at least 200 bits of useful information information are retrieved in a single memory access. In some applications of the present inventions it is most preferable to retrieve at least 500 bits of useful information.

The present invention successfully addresses the shortcomings of the existing technologies by providing a system for and method of significantly improving the sped of radix-search methods with substantially no increase (and usually a decease) in the memory space required.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of, illustrative discussion of the preferred embodiments of the present invention only, and are presented in the cause of providing what s believed to be the most useful and readily understood description of the principles and conceptual aspects of the invention. In this regard, no attempt made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present invention is a method and system for achieving improved performance of radix-search methods and the like by using a look-ahead tree structure in conjunction with a high band-width memory access.

The principles and operation of the look-ahead tree structure according to the present invention may be better understood with reference to the drawings and the accompanying description.

Figure 1:
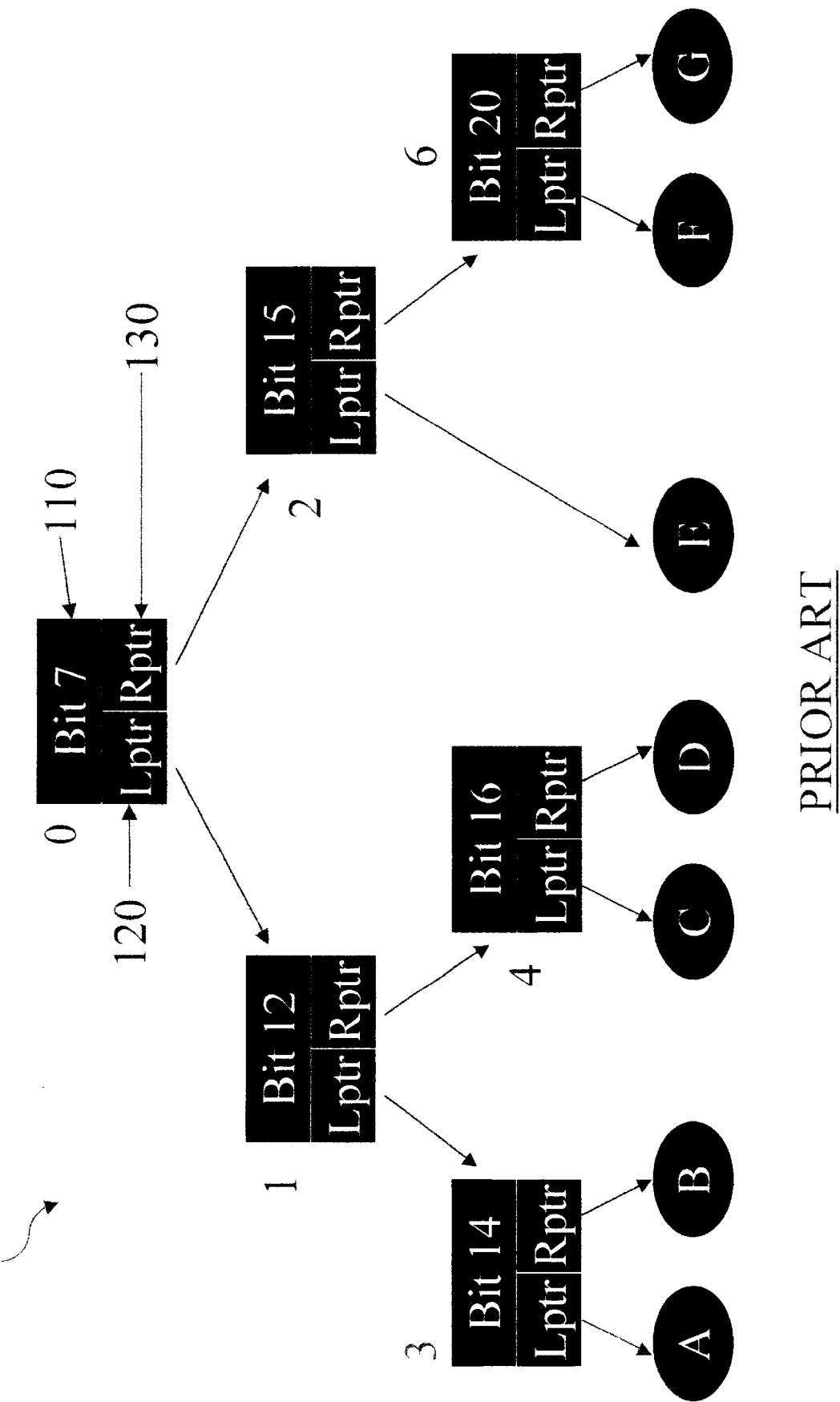
FIG. 1 is a tree structure according to the prior art.

Referring now to the drawings, FIG. 1 illustrates a tree structure 100 according to the prior art. The tree 100 contains nodes 0,1,2,3,4,6, linking nodes A,B,C,D,F,G, which point to sub-trees, and a leaf E, containing data. Each node 0,1,2,3,4,6 is characterized by a bit number 110, a left pointer 120 pointing to the left child, and a right pointer 130 pointing to the right child. Thus, nodes 3 and 4 are children of node 1, leaf E and node 6 are children of node 2, and node 0 is the parent of node 1 and node 2.

By convention, a child is the next node to examine when walking down the tree during a tree search. The left child is examined if the parent's value is zero. The right child is examined if the parent's value is one.

If, by way of example, we are provided with a search string 01101100011111101011, the 7th bit from the left is 0, the 12th bit is 1, the fourteenth bit is 1, the fifteenth bit is 1, the sixteenth bit is 0, and the twentieth bit is 1.

In a prior art search, the first memory access reads node 0 at the head of the tree, which contains bit no.7, a left pointer pointing to node 1 and a right pointer pointing to node 2. The processor (not shown) compares the information obtained with the search string. The 7th bit being 0, the next memory access reeds node 1, and returns bit no. 12, a left pointer pointing to node 3 and a right pointer pointing to node 4. The processor (not shown) compares the information obtained with the 12th bit of the search string (12th bit=1), and in the next memory access, reads node 4. Node 4 contains bit no. 16, a left pointer pointing to node C and a right pointer pointing to node D. Node C and node D point to their respective sub-trees (not shown).

In the following search string, 01101110011111101011, the 7th bit is 1, the 12th bit is 1, he fourteenth bit is 1, the fifteenth bit is 1, the sixteenth bit is 0, and the twentieth bit is 1. Thus, after reading node 0, the next memory access would be a node 2, and the following memory access would be at leaf E. Leaf E contains the (desired) data.

It is evident from the description that the search mechanism of the prior art takes four memory accesses to reach additional sub-trees, i.e., nodes A,B,C,D,F and G, and three memory accesses to reach leaf E.

Moreover, the tree presented in FIG. 1 characterizes the logical connection between the various nodes (and leaf); physically, each node is stored in the memory in a substantially random fashion. The memory manager fits new nodes, leaves etc. into small vacancies in the memory block, in order to improve the storage efficiency. Consequently, each pointer pointing to a right child, left child, sub-tree, etc. requires many bits to adequately describe the location within the memory block. Typically, such a pointer has a length of 16–20 bits.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

Figure 2:
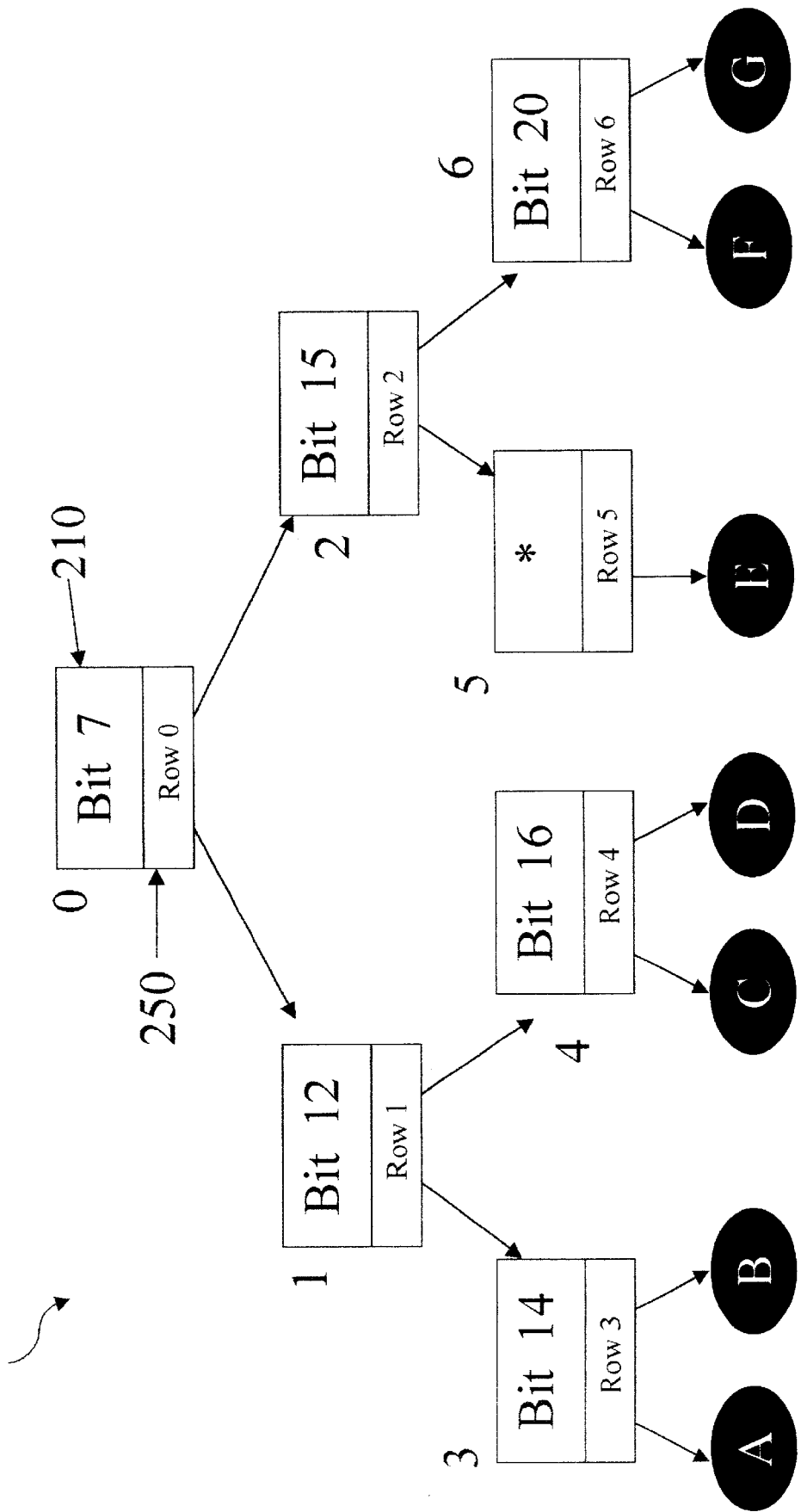
FIG. 2 shows a tree structure and node contents according to the present invention.

The tree structure and node contents according to the present invention are provided in FIG. 2 and in Table 1a and 1b, respectively. The tree 200 contains nodes 0,1,2,3,4,5,6, linking nodes A,B,C,D,F,G, which point to sub-trees, and a leaf E, containing data. This is essentially the same structure as the tree structure of the prior art, except that an additional node 5 has been inserted at the defective point in the tree. As in the prior art, each node 0,1,2,3,4,5,6 is claracterized by a bit number 110. However, in sharp contrast to the prior art, the information on each node (or leaf), left and right children, etc., is provided in a compact table, as shown by way of example below in Table 1a.

Table 1a is a table according to the present invention, which is stored as a block within the memory. Each node 0,1,2,3,4,5,6 in FIG. 2 corresponds to a row in Table 1a. The node (row) no. is provided at the left of the table in order to facilitate the description and understanding; it is not, however, an integral part of the table as stored in the memory.

In Table 1a, Column I indicates whether a particular node has node children (0) or a leaf (1). Column II denotes the location or bit number in the string to be examined. Column III refers to Column IV and indicates whether the value located in Column IV refers to a row number in Table 1a (0) or to the row number of a pointer in Table 1b (1). Table 1b has a single column with a pointer value (or actual data) at each row, corresponding to the row number.

Referring now to node 0 on line 0 of Table 1a, Column I (0) denotes that node 0 has node children. Column II (7) delineates that we examine the 7th bit in the string. Column III (0) indicates that the value in Column IV (1) is a row number in Table 1a or in 1b. By a convention of the present invention, the row number referenced in Column IV refers to the left child. Thus, the attributes of the left child (=the 12th bit in the string) of the 7th bit are stored in Row 1. Also by a convention of the present invention, the attributes of a given right child are stored in the row immediately following the row of the let child. Thus, the attributes of the right child (=the 15th bit in the string) of the 7th bit are stored in Row 2.

Similarly, the attributes of the left (=the 14th bit in the string) and right (=the 16th bit in the string) children of the 12th bit are stored in Row 3 and Row 4, respectively. Both Row 3 and Row 4 have a value of 1 in Column 3, which indicates 1hat the values in Column IV are row numbers in the pointer table (Table 1b). Thus, the left child of the 14th bit in the string is located in Row 0 of the pointer table. Upon examination of Row 0, the left child of the 14th bit in the string is identified as sub-tree A. Again, according to the convention of the present invention, the row succeeding the row of the left child is that of the right child. Hence, Row 1 of the pointer table points to the location of the right child of the 14th bit in the string, the right child being sub-tree B.

Referring now to Row 2 of Table 1a, Column III indicates that the value (5) in Column IV is a row number in the present table. In Row 5, we see from Column II (1) that there is a leaf associated with the 15th bit in the string (Row 2), and that the location of the leaf is Row 4 of the pointer table. The leaf is reached during the search if the 15$^{th}$ bit of the search string (key) is zero. Thus, Leaf E contains a pointer to the data (or in some implementations the actual data) being searched for.

TABLE 1a

| Node (Row) No. | I Leaf (1) | II Location in String (9) | III Pointer/Next (1) | IV Next (3) |
|---|---|---|---|---|
| 0 | 0 | 7  | 0 | 1 |
| 1 | 0 | 12 | 0 | 3 |
| 2 | 0 | 15 | 0 | 5 |
| 3 | 0 | 14 | 1 | 0 |
| 4 | 0 | 16 | 1 | 2 |
| 5 | 1 | 0  | 1 | 4 |
| 6 | 0 | 20 | 1 | 5 |

TABLE 1b

| ROW | Pointer (18) |
|---|---|
| 0 | A |
| 1 | B |
| 2 | C |
| 3 | D |
| 4 | E |
| 5 | F |
| 6 | G |
| 7 | — |

In parentheses, are the number of bits used for each field at each row, in the implementation described.

Thus, Table 1a and Table 1b contain not only the information associated with node 0 and the left and right children thereof (as in prior art structures). The tables contain all the requisite information pertaining to the children and grandchildren of node 0, and pointers pointing to sub-trees and leaf stored elsewhere in the memory. As will be demonstrated below in Example 2, the representation in the above-mentioned tables can be achieved using 256 bits. Hence, all of the information in the tables can be accessed in a single access with a system having a memory access bus width of at least 256 bits.

From the above description, it is obvious to one well-versed in the art that the search routine according to the present invention has several important features and advantages relative to methods of the prior art. Given a memory access bus width of at least 256 bits, the structure of the look-ahead tree and the storage of the tree in a compact memory block allow the entire look ahead structure (containing a 7 node tree structure having a depth of three) to be accessed in a single memory cycle. Using storage techniques of the prior art, in which nodes a stored at random throughout the data storage space and not as sub-trees store in a contiguous region, each memory access retrieves information on one node alone. Moreover, given the storage structure of nodes of the prior art, in which each node has a lengthy left pointer and a lengthy right pointer, the use of tables to store sub-tree information would require an appreciably higher allocation of memory space.

In sharp contrast to such prior-art structures, however, the data table structures of the present invention provide an efficient method of storing the requisite information, such that there is substantially no increase in the memory space allocation as compared to the prior art. Surprisingly, a moderate decrease increase in the memory space allocation as compared to the prior art is usually achieved.

Although many modifications of the table structures are possible within the broad scope of the present invention, many of the savings in memory space are evident from Table 1 and Table 2. For example, the table structure eliminates entirely the need for a right pointer. Instead, a convention is established wherein the attributes of a right child of a particular node are always placed in the row following the attributes of the left child. Moreover, although pointers for left children have not been eliminated, the requisite storage area for such pointers has been drastically reduced for nodes situated within the same sub-tree. Whereas in prior art memory storage, the pointer must be of sufficient length to define the location of the child within the entire memory, the pointer in the present invention merely has to define the row of the child in the tiny sub-tree table.

Although several advantages and memory savings have been described above, additional advantages will be apparent to those well-versed in the art. Also, although, in the description above, a single bit in each node is examined, the same method is applicable also if at each node, several bits are examined.

Figure 3:
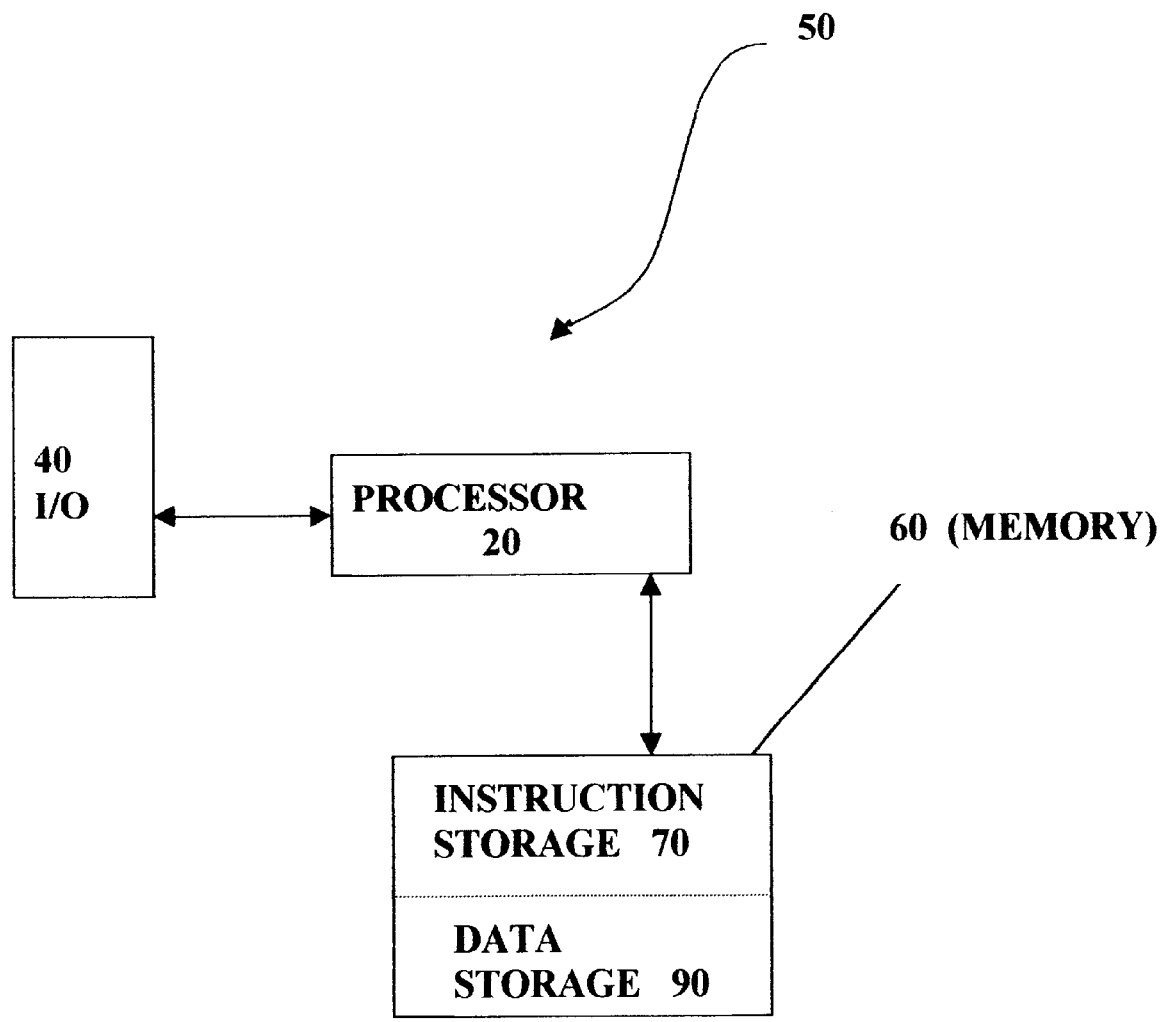
FIG. 3 is a block diagram of a system according to the present invention.

FIG. 3 is a block diagram of a system 50 according to the present invention. System 50 includes a processor 20, a memory 60, and an I/O block 40. Memory 60 includes an instruction storage area 70 and a data storage area 90. This general system architecture allows the processor 20 to access the data storage area 90 and retrieve the look ahead tree structure of the present invention.

As used he rein in the specification and in the claims section that follows, the term "sub-tree" refers to at least one node within a radix-search tree. Typically, the sub-tree is stored in a contiguous region and is retrieved in a single memory access.

As used herein in the specification and in the claims section that follows, the term "node attribute" refers to data associated with a particular node, e g., a pointer pointing to a child inside or outside of the sub-tree.

Reference is now made to the following examples, which together with the above descriptions, illustrate the invention in a non-limiting fashion.

EXAMPLE 1 (PRIOR ART)

The following example assumes a 256 bit memory band width, i.e., 256 bits are read in one read cycle.

Each node in the tree is composed of:

Location: 9 bits

Left pointer: 18 bits

Right pointer: 18 bits

Node is leaf: 2 bits

Leaf size Left+Right: 4 bits

Total node size: 51 bits

A single note is read per memory access. Hence, 256−51=205 bits out of 256 bits (80%) are wasted, corresponding to a memory storage capacity utilization of only about 20%. Moreover, three memory accesses are required to walk down a 7 node tree structure having a depth of three. More generally, for n nodes in a tree, $\log_2(n+1)=d$, the depth of the tree or memory accesses that are required to walk down the tree.

EXAMPLE 2

As in the preceding example, the following example assumes the data width of the memory 256 bit, i.e. 256 bits are read in one read cycle.

A look ahead memory structure is composed of a tree or sub-tree and its respective pointer table.

Each node in the tree is composed of:

Leaf (yes/no): 1 bit

Location: 9 bits

Next row is in node table or pointer table: 1 bit

Next row number: 3 bits

Leaf size: 2 bits

Total node size: 16 bits

For all 7 rows (nodes) of the node table, 112 bits (7×16 bits) are required.

As in the prior art, each pointer entry in the pointer table is composed of 18 bits. For 8 entries (pointers) in the pointer table, 144 bits (8×18 bits) are required.

For the entire look ahead structure containing 7 nodes (in a tree structure having a depth of three) and 8 entries (pointers) in the pointer table, the total memory space equals 256 bits (112+144).

Thus, an entire look ahead structure is read per memory cycle, i.e., a single memory access is required to walk down a 7 node tree structure. No bits are wasted (256−256=0), such that the memory storage capacity utilization is 100%.

It will be appreciated that the above descriptions are intended only to serve as examples, and that many other embodiments are possible within the spirit and the scope of the present invention.

What is claimed is:

1. A method for storing and retrieving data corresponding to a radix-search tree, the method comprising:
   (a) providing a system including:
      (i) a data storage module for storing a plurality of sub-trees, and
      (ii) a processor operatively connected to said data storage module;
   (b) storing, within said data storage module, a plurality of nodes belonging to a radix-search tree, wherein at least one of said nodes has a right child and a left child, said nodes having node-attributes, and
   (c) performing, using said processor, at least two complete search steps in a search path within said radix search tree, said at least three search steps being performed in a single memory access.

2. The method of claim 1, wherein said radix-search tree is stored in a contiguous memory block.

3. A method for storing and retrieving data corresponding to a radix-search tree, the method comprising:
   (a) storing the radix-search tree as a plurality of look-ahead structures, each look-ahead structure of said look-ahead structures containing at least two nodes corresponding to a single sub-tree on a search path within the radix-search tree, and
   (b) retrieving at least one complete look-ahead structure of said look-ahead structures in a single memory access, and wherein said look-ahead structure contains all possible search paths for at least two search steps in said sub-tree.

4. The method of claim 3, wherein said look-ahead structure contains information corresponding to search paths for at least three search steps in said sub-tree.

5. The method of claim 3, wherein said look-ahead structure contains information corresponding to all possible search paths for at least three search steps in said sub-tree.

6. The method of claim 3, wherein said look-ahead structure is a table.

7. The method of claim 6, wherein information for each particular node of said nodes is stored in a single row of said table.

8. The method of claim 6, wherein information for each particular node of said nodes is stored in said table, said information including whether said particular node has node children or a leaf.

9. The method of claim 6, wherein information for each particular node of said nodes is stored in said table, said information including a value for indicating a row number in said table.

10. The method of claim 6, wherein information for each particular node of said node is stored in said table, said information including a value for indicating a row number of a pointer in a second table.

11. The method of claim 6, wherein information for each particular node of said nodes is stored in said table, said information including a value for indicating:
   (A) a row number in said table, or
   (B) a row number of a pointer in a second table, and an indicator bit for indicating whether said value corresponds to (A) or (B).

12. The method of claim 3, wherein said single memory access systematically retrieves at least 200 bits of useful information.

13. The method of claim 3, wherein said single memory access systematically retrieves at least 500 bits of useful information.

14. The method of claim 3, wherein each said look-ahead structure is stored in a contiguous memory block.

15. A system for storing and retrieving data using a radix-search tree having nodes and leaves, wherein at least one node has a right child and a left child, the system comprising:
   (a) a data storage module for storing the radix-search tree as a plurality of look-ahead structures, each look-ahead structure of said look-ahead structures containing at least two nodes corresponding to a single sub-tree on a search path within the radix-search tree
   (b) a processor, operatively connected to said module, for performing operations including:
      (i) storing the radix-search tree as a plurality of look-ahead structures, each look-ahead structure of said look-ahead structures containing at least two nodes corresponding to a single sub-tree on a search path within the radix-search tree, and
      (ii) retrieving at least one complete look-ahead structure of said look-ahead structures in a single memory access,
      and wherein said look-ahead structure contains information corresponding to all possible search paths for at least two complete search steps in said sub-tree.

16. The system of claim 15, wherein each of said look-ahead structures is stored in a contiguous memory block.

17. The system of claim 15, wherein said look-ahead structure contains information corresponding to search paths for at least three search steps in said sub-tree.

18. The system of claim 15, wherein said look-ahead structure contains information corresponding to all possible search paths for at least three search steps in said sub-tree.

19. The system of claim 15, wherein said look-ahead structure is designed and configured so as to systematically enable said processor to retrieve at least 200 bits of useful information in said single memory access.

20. The system of claim 15, wherein said look-ahead structure is designed and configured so as to systematically enable said processor to retrieve at least 500 bits of useful information in said single memory access.

21. The system of claim 15, wherein said look-ahead structure contains information corresponding to a first pointer pointing to a node address within a contiguous memory block, and a second pointer pointing to a node address located outside of said contiguous memory block.

22. The system of claim 16, wherein said look-ahead structure contains information stored in a table, said information including at least one pointer pointing to at least one address selected from the group consisting of node address and leaf address, said at least one address being located outside of said contiguous memory block.

23. The system of claim 22, wherein said at least one pointer is stored in a separate table.

24. The system of claim 15, wherein said look-ahead structure contains information stored in a table, said information including a single pointer that is used to identify the memory addresses of both the right child and the left child of the node.

25. The system of claim 15, wherein said look-ahead structure contains information stored in at least one table, said information including node attributes of the right child and the left child, said attributes stored in adjacent rows of said at least one table.

26. The system of claim 15, wherein said look-ahead structure contains information stored in at least one table, said information including node attributes to the right child and the left child, said attributes stored in adjacent columns of said at least one table.

* * * * *